(12) United States Patent
Berstis et al.

(10) Patent No.: US 8,849,915 B2
(45) Date of Patent: Sep. 30, 2014

(54) EASE OF USE FEATURE FOR AUDIO COMMUNICATIONS WITHIN CHAT CONFERENCES

(75) Inventors: Viktors Berstis, Austin, TX (US); Randolph M. Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 12/126,837

(22) Filed: May 23, 2008

(65) Prior Publication Data
US 2008/0222536 A1 Sep. 11, 2008

Related U.S. Application Data

(63) Continuation of application No. 11/355,641, filed on Feb. 16, 2006, now abandoned.

(51) Int. Cl.
*G06F 15/16* (2006.01)
*G06Q 10/10* (2012.01)

(52) U.S. Cl.
CPC .................................. *G06Q 10/10* (2013.01)
USPC ........................................................ 709/205

(58) Field of Classification Search
CPC .................................................. G06Q 10/10
USPC ................................................ 709/207, 205
See application file for complete search history.

(56) References Cited

U.S. PATENT DOCUMENTS

| | | | |
|---|---|---|---|
| 4,468,813 A * | 8/1984 | Burke et al. ................. | 340/7.57 |
| 5,146,502 A | 9/1992 | Davis | |
| 5,699,409 A | 12/1997 | Kojima | |
| 5,990,933 A | 11/1999 | Ozone et al. | |
| 6,058,389 A | 5/2000 | Chandra et al. | |
| 6,353,660 B1 | 3/2002 | Burger et al. | |
| 6,865,398 B2 | 3/2005 | Mangal et al. | |
| 6,925,605 B2 | 8/2005 | Bates et al. | |

(Continued)

FOREIGN PATENT DOCUMENTS

| | | |
|---|---|---|
| DE | 4138886 C1 | 4/1993 |
| DE | 4324573 C | 10/1994 |
| DE | 19715225 A1 | 10/1998 |
| EP | 1039728 A1 | 9/2000 |

OTHER PUBLICATIONS

ICQ. "ICQ:Voice Message—Plugin". May 8, 1999.*
ICQ. "ICQ: The USer Menu". Aug. 15, 2000.*

(Continued)

*Primary Examiner* — Bryan Lee
(74) *Attorney, Agent, or Firm* — Mark C. Vallone

(57) ABSTRACT

Methods and arrangements to communicate aurally during a chat conference are contemplated. Embodiments include transformations, code, state machines or other logic to communicate aurally during a chat conference by receiving through a user interface for the chat conference the designation of a participant in the chat conference, receiving through the user interface for the chat conference a command to capture audio, capturing audio, and transmitting the captured audio to the participant based upon the designation of the participant. In some embodiments, a participant may be designated by a mouse click on a name representing the participant. In some embodiments, the command to capture audio may be expressed by holding down a mouse button. In alternate embodiments, the command to capture audio may be expressed by a pop-up menu. In further embodiments, the captured audio may be stored and transmitted to additional participants.

18 Claims, 6 Drawing Sheets

(56) References Cited

U.S. PATENT DOCUMENTS

| | | | |
|---|---|---|---|
| 7,007,085 B1 | 2/2006 | Malik | |
| 7,032,030 B1 | 4/2006 | Codignotto | |
| 7,123,695 B2* | 10/2006 | Malik | 379/88.13 |
| 7,243,060 B2 | 7/2007 | Atlas et al. | |
| 7,599,354 B2 | 10/2009 | Bratt et al. | |
| 7,716,479 B2 | 5/2010 | Vargas et al. | |
| 7,738,638 B1 | 6/2010 | Henderson | |
| 7,856,088 B2 | 12/2010 | Janssen | |
| 7,869,579 B2 | 1/2011 | Kwon | |
| 8,503,622 B2 | 8/2013 | Berstis et al. | |
| 2001/0012286 A1 | 8/2001 | Huna et al. | |
| 2002/0032870 A1 | 3/2002 | Spusta et al. | |
| 2002/0039916 A1 | 4/2002 | Hosoi | |
| 2003/0035412 A1 | 2/2003 | Wang et al. | |
| 2003/0212553 A1 | 11/2003 | Tsoi et al. | |
| 2003/0215078 A1 | 11/2003 | Brahm et al. | |
| 2003/0219104 A1* | 11/2003 | Malik | 379/88.11 |
| 2003/0235407 A1 | 12/2003 | Lord | |
| 2004/0001482 A1 | 1/2004 | Yeom | |
| 2004/0109023 A1 | 6/2004 | Tsuchiya | |
| 2004/0186887 A1* | 9/2004 | Galli et al. | 709/206 |
| 2004/0225502 A1* | 11/2004 | Bear et al. | 704/270 |
| 2005/0027802 A1* | 2/2005 | Madsen et al. | 709/204 |
| 2005/0041786 A1 | 2/2005 | Craig | |
| 2005/0107071 A1* | 5/2005 | Benco et al. | 455/413 |
| 2005/0144247 A1 | 6/2005 | Christensen et al. | |
| 2005/0159833 A1 | 7/2005 | Giaimo et al. | |
| 2005/0209932 A1 | 9/2005 | Hui | |
| 2005/0210394 A1* | 9/2005 | Crandall et al. | 715/752 |
| 2005/0259638 A1 | 11/2005 | Burg | |
| 2006/0010222 A1* | 1/2006 | Cleron et al. | 709/206 |
| 2006/0029195 A1 | 2/2006 | Mullis et al. | |
| 2006/0174207 A1 | 8/2006 | Deshpande | |
| 2006/0212291 A1 | 9/2006 | Matsuo | |
| 2006/0256771 A1 | 11/2006 | Yarlagadda | |
| 2006/0291580 A1 | 12/2006 | Horvitz | |
| 2007/0036292 A1* | 2/2007 | Selbie et al. | 379/88.14 |
| 2007/0071206 A1 | 3/2007 | Gainsboro et al. | |
| 2007/0083772 A1 | 4/2007 | Harada et al. | |
| 2007/0112925 A1* | 5/2007 | Malik | 709/206 |
| 2007/0121966 A1 | 5/2007 | Plastina et al. | |
| 2007/0147207 A1 | 6/2007 | Sako et al. | |
| 2007/0192427 A1 | 8/2007 | Berstis et al. | |
| 2007/0274293 A1 | 11/2007 | Forbes | |
| 2007/0299657 A1 | 12/2007 | Kang et al. | |
| 2008/0037725 A1 | 2/2008 | Berstis et al. | |
| 2008/0065735 A1* | 3/2008 | Szeto et al. | 709/206 |
| 2008/0069310 A1 | 3/2008 | Berstis et al. | |
| 2008/0107045 A1 | 5/2008 | Berstis et al. | |
| 2008/0222536 A1 | 9/2008 | Berstis et al. | |

OTHER PUBLICATIONS

ICQ: A User's Guide, Rose Vines, 1999, 7 pgs.
"Google Talk—Talk and IM with your Friends for Free", copyright 2008 Google, http://www.google.com/talk/, 1 pg.
Final Office Action (Mail Date Mar. 9, 2009); U.S. Appl. No. 11/355,641, filed Feb. 16, 2006; 13 pgs.
OfficeAction (Mail Date Sep. 4, 2008), U.S. Appl. No. 11/355,641, filed Feb. 16, 2006; 20 pgs.
Final Office Action (Mail Date May 3, 2011); U.S. Appl. No. 11/555,744, filed Nov. 2, 2006; 30 pgs.
Office Action (Mail date Feb. 8, 2011); U.S. Appl. No. 11/555,744, filed Nov. 2, 2006; 17 pgs.
Office Action (Mail date Dec. 19, 2013); U.S. Appl. No. 11/456,500, filed Jul. 10, 2006; 21 pgs.
Final Office Action (Mail date Oct. 18, 2010); U.S. Appl. No. 11/456,500, filed Jul. 10, 2006; 13 pgs.
Office Action (Mail date May 25, 2010); U.S. Appl. No. 11/456,500, filed Jul. 10, 2006; 11 pgs.
Notice of Allowance and Fees Due (Mail date Apr. 2, 2013); U.S. Appl. No. 11/532,118, filed Sep. 15, 2006; 20 pgs.
Notice of Allowance and Fees Due, (Mail date Dec. 26, 2012); U.S. Appl. No. 11/532,118, filed Sep. 15, 2006; 12 pgs.
Final Office Action, (Mail date Jul. 10, 2012); U.S. Appl. No. 11/532,118, filed Sep. 15, 2006; 15 pgs.
Office Action, (Mail date Feb. 25, 2011); U.S. Appl. No. 11/532,118, filed Sep. 15, 2006; 11 pgs.
http://www.google.com/talk/, "Google Talk—Talk and IM with your friends for free," p. 1, Feb. 9, 2006.

* cited by examiner

EASE OF USE FEATURE FOR AUDIO COMMUNICATIONS WITHIN CHAT CONFERENCES

CROSS-REFERENCES TO RELATED APPLICATIONS

Pursuant to 35 USC §120, this continuation application claims priority to and benefit of U.S. patent application Ser. No. 11/355,641, entitled "EASE OF USE FEATURE FOR AUDIO COMMUNICATIONS WITHIN CHAT CONFERENCES", filed on Feb. 16, 2006, now abandoned the disclosure of which is incorporated herein in its entirety for all purposes.

BACKGROUND OF THE INVENTION

The present invention is in the field of the audio communications over a network. More particularly, the present invention relates to methods and arrangements to transmit audio over a network during a chat conference.

Chat conferences are the real-time exchange of text among groups of people. Chat conferences are popular among social and business users. Social users can gossip and discuss fields of interest. Business users may be able to avoid in-person conferences by participating in the chat conferences, thereby avoiding the concomitant travel and disruption. In addition, because the chat conferences are far more convenient and easier to arrange, business users can participate in them more often and more flexibly. Chat conferences may be formed spontaneously. One person can join others, or several people may each join several others.

Voice over Internet protocol (VoIP) is a method for the real-time exchange of speech and other audio over the Internet and other networks. Some versions may specify destinations with telephone numbers. Other versions may specify destinations with Internet Protocol (IP) addresses. A participant in a chat conference may have access to a VoIP system on the computer or other device the participant uses to connect to the conference. The participant may use the VoIP system to call another of the participants and engage in a private voice conversation while the chat conference is proceeding.

FIG. 1 depicts a prior art embodiment of a display 400 containing a chat conference interface window 405 and a VoIP interface window 425 for unintegrated chat conference and VoIP applications. Chat conference window 405 includes a conference display panel 410, a contacts list 415, and an input panel 420. The conference display panel 410 may display the messages transmitted through the conference. Input panel 420 may provide space for entering text to be transmitted to the conference. The contacts list 415 may display a list of participants in the conference and other frequent contacts and their status. A participant may be able to click on a name from the list to invite the person represented to join the conference.

The VoIP window 425 includes a contacts list 430 and a transmitting control panel 445 with start transmitting 435 and stop transmitting 440 buttons. The contacts list 430 may display a list of contacts. A chat conference participant may be able to click on a name to make a call to the person represented. The participant may then click the start transmitting button 435 to begin a conversation and click the stop transmitting button 440 when the conversation is complete. The contacts list 430 of the VoIP application may, however, not be integrated with the contacts list 415 of the chat conference application. Another participant of the conference may not be listed on the contacts list 430 or may be listed at an address other than address for the conference. As a result, it may be difficult to call the other participant over the VoIP application during the chat conference. Even if the VoIP address of the other participant is available, it may be inconvenient to use the VoIP system to make a call during the chat conference. To make the VoIP call to the other participant, the participant may be required to launch the VoIP window, locate the other participant in the contacts list 430 or manually enter the correct address, and go through several more steps to make the call. By the time the participant has completed all of the procedures, the chat conference may have moved past the topic on which the participant desired to comment.

BRIEF SUMMARY OF THE INVENTION

The problems identified above are in large part addressed by methods and arrangements to communicate aurally during a chat conference. One embodiment provides a method to communicate aurally during a chat conference. The method may involve receiving through a user interface for the chat conference a designation of a participant in the chat conference. The method may also involve receiving through the user interface for the chat conference a command to capture audio and may also involve capturing the audio. The method may further involve transmitting the captured audio to the participant based upon the designation of the participant.

Another embodiment provides an apparatus to communicate aurally during a chat conference. The apparatus may comprise an audio client module to transmit audio to designated participants. The apparatus may comprise further a chat conference client module to relay text messages among chat conference participants. The chat conference client module may comprise a chat conference user interface coupled to the audio client module to present to conference participants a list of chat conference participants and to receive commands to transmit audio to designated participants.

Another embodiment provides a machine-accessible medium containing instructions to communicate aurally during a chat conference, which when the instructions are executed by a machine, cause said machine to perform operations. The operations may involve receiving through a user interface for the chat conference a designation of a participant in the chat conference. The operations may also involve receiving through the user interface for the chat conference a command to capture audio and may also involve capturing the audio. The operations may further involve transmitting the captured audio to the participant based upon the designation of the participant.

BRIEF DESCRIPTION OF THE SEVERAL VIEWS OF THE DRAWINGS

Advantages of the invention will become apparent upon reading the following detailed description and upon reference to the accompanying drawings in which like references may indicate similar elements.

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to communicate aurally during a chat conference are contemplated. Embodiments include transformations, code, state machines or other logic to communicate aurally during a chat conference by receiving through a user interface for the chat conference the designation of a participant in the chat conference, receiving through the user interface for the chat conference a command to capture audio, capturing audio, and transmitting the captured audio to the participant based upon the designation of the participant. In some embodiments, a participant may be designated by a mouse click on a name representing the participant. In some embodiments, the command to capture audio may be expressed by holding down a mouse button. In some embodiments, positioning a mouse to place a pointer over a name, and manipulating a single mouse button may select the participant, start the capturing of audio, end the capturing of audio, and transmit the captured audio to the participant. In alternate embodiments, the command to capture audio may be expressed by a pop-up menu. In further embodiments, the captured audio may be stored and transmitted to additional participants.

While specific embodiments will be described below with reference to particular circuit or logic configurations, those of skill in the art will realize that embodiments of the present invention may advantageously be implemented with other substantially equivalent configurations.

Figure 2:
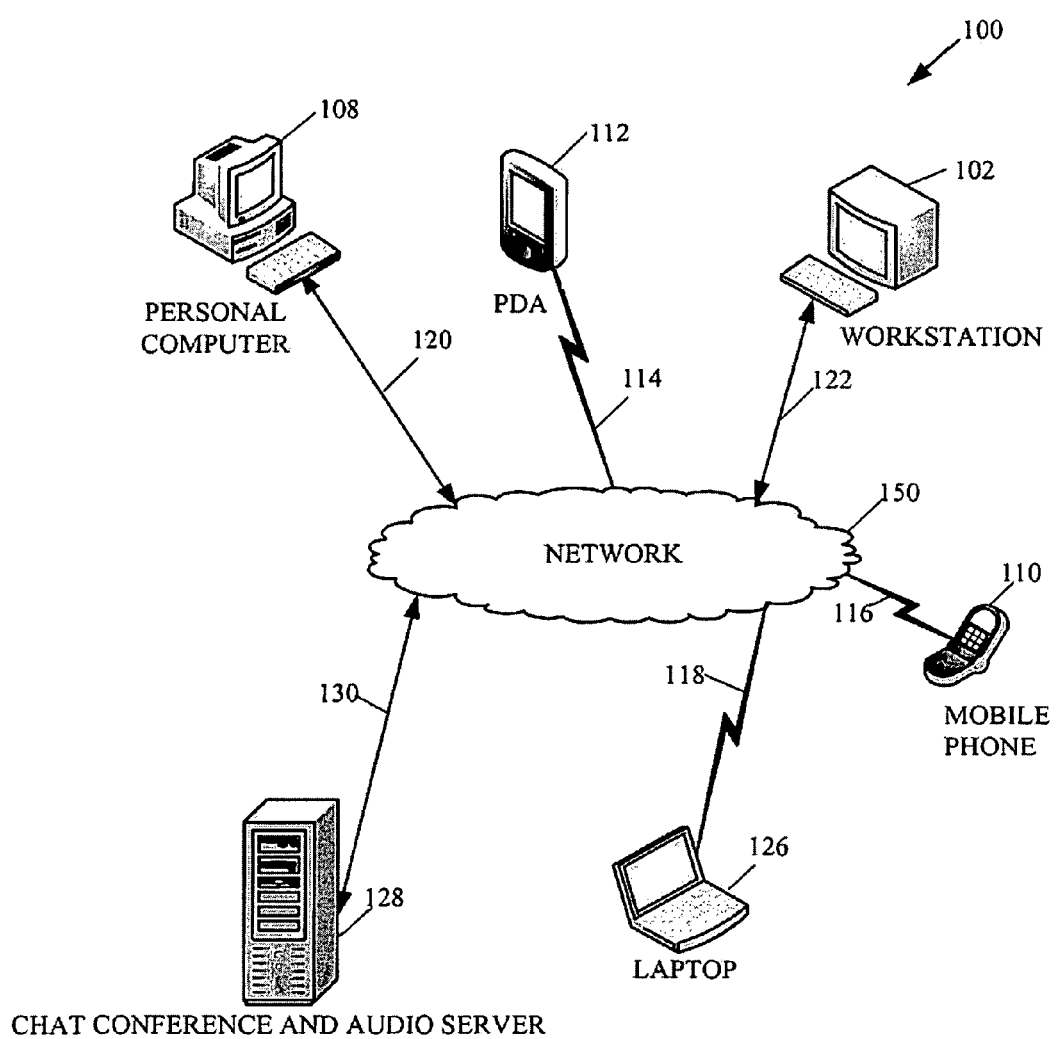
FIG. 2 depicts a network diagram of an embodiment of devices capable of audio communication during a chat conference.

FIG. 2 depicts a diagram of an embodiment of a networked system 100 of devices capable of communicating aurally during a chat conference. The system 100 includes a network 150, chat conference and audio server 128 connected to network 150 through wireline connection 130, and a variety of devices capable of communicating aurally during a chat conference (conference participant network devices), including:
- workstation 102, a computer coupled to network 150 through wireline connection 122,
- personal computer 108, coupled to network 150 through wireline connection 120,
- personal digital assistant 112, coupled to network 150 through wireless connection 114,
- laptop computer 126, coupled to network 150 through wireless connection 118; and
- mobile phone 110, coupled to network 150 through wireless connection 116.

Network 150, which may consist of the Internet or another wide area network, a local area network, or a combination of networks, may provide data communications among the chat conference and audio server 128 and the conference participant network devices 102, 108, 112, 126, and 110. Chat conference and audio server 128 may administer a chat conference. A chat conference may be the real-time exchange of text messages among a group of people. Chat conference and audio server software 128 may have been installed and be operative to connect to the participants in a chat conference. In some embodiments, the chat conference and audio server 128 may inform each participant of the status of other conference participants and other contacts of the participant. In some embodiments, the chat conference and audio server 128 may also receive text messages from the conference participants and relay them to the other participants. In other embodiments, the participants may send messages directly to the other participants once they have connected to chat conference and audio server 128 to join the conference. In still other embodiments, the chat conference may function without a chat conference and audio server.

Users at the conference participant devices may participate in a chat conference through conference participant network devices such as devices 102, 108, 112, 126, and 110. In some embodiments, participants in a chat conference may run client software on their conference participant network devices. When a participant opens a client, the client attempts to connect with chat conference and audio server 128. If the connection is successful, the client may inform the chat conference and audio server 128 of the participant's Internet Protocol (IP) address, a number identifying the conference participant network device, and the number of a port assigned to the client. In other embodiments, a participant may visit a web site to log onto a conference. No client software may reside on the participant's conference participant network device. A conference participant may enter a text message for the conference into a conference participant device. In some embodiments, the text message may be transmitted across the network 150 to the chat conference and audio server 128 and may be relayed to the other participants by chat conference and audio server 128. In other embodiments, the text message may be transmitted from one participant to the others without being relayed through the chat conference and audio server 128.

System 100 may also provide for the transmission of audio messages from one chat conference participant at one conference participant network device such as device 102, 108, 112, 126, or 110 to another chat conference participant at another conference participant network device by conversion of the content of the audio messages into digital form, transmission of the content in digital form across network 150 to the other participant, and the conversion of the digital content back to audio content for playing by the other participant's conference participant network device. In some embodiments, the audio messages may be sent directly from one participant's conference participant network device to another participant's conference participant network device without relay through the chat conference and audio server 128. A client running on a participant's conference participant network device may have obtained connection information such as IP addresses and ports from the chat conference and audio server 128. In alternative embodiments, the audio messages may be relayed through the chat conference and audio server 128. The audio messages may be sent under a variety of protocols, or methods for bundling up the digital content and transmitting the digital content across network 150. When the client sending an audio message adheres to an agreed-upon protocol, the client receiving the audio message may know how to process the audio message. The receiving client may know what to expect in terms of the format of the message and the manner in which the message was sent across the network 150. Protocols for transmitting audio across a network such as network 150 include H.323, a standard created for multimedia data including audio and video by the International Telecommunication Union (ITU); Media Gateway Control Protocol (MGCP); and Session Initiation Protocol (SIP).

The arrangement of the server and other devices making up the exemplary system illustrated in FIG. 2 is for explanation, not for limitation. Data processing systems useful according to various embodiments of the present invention may not include a server, or may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
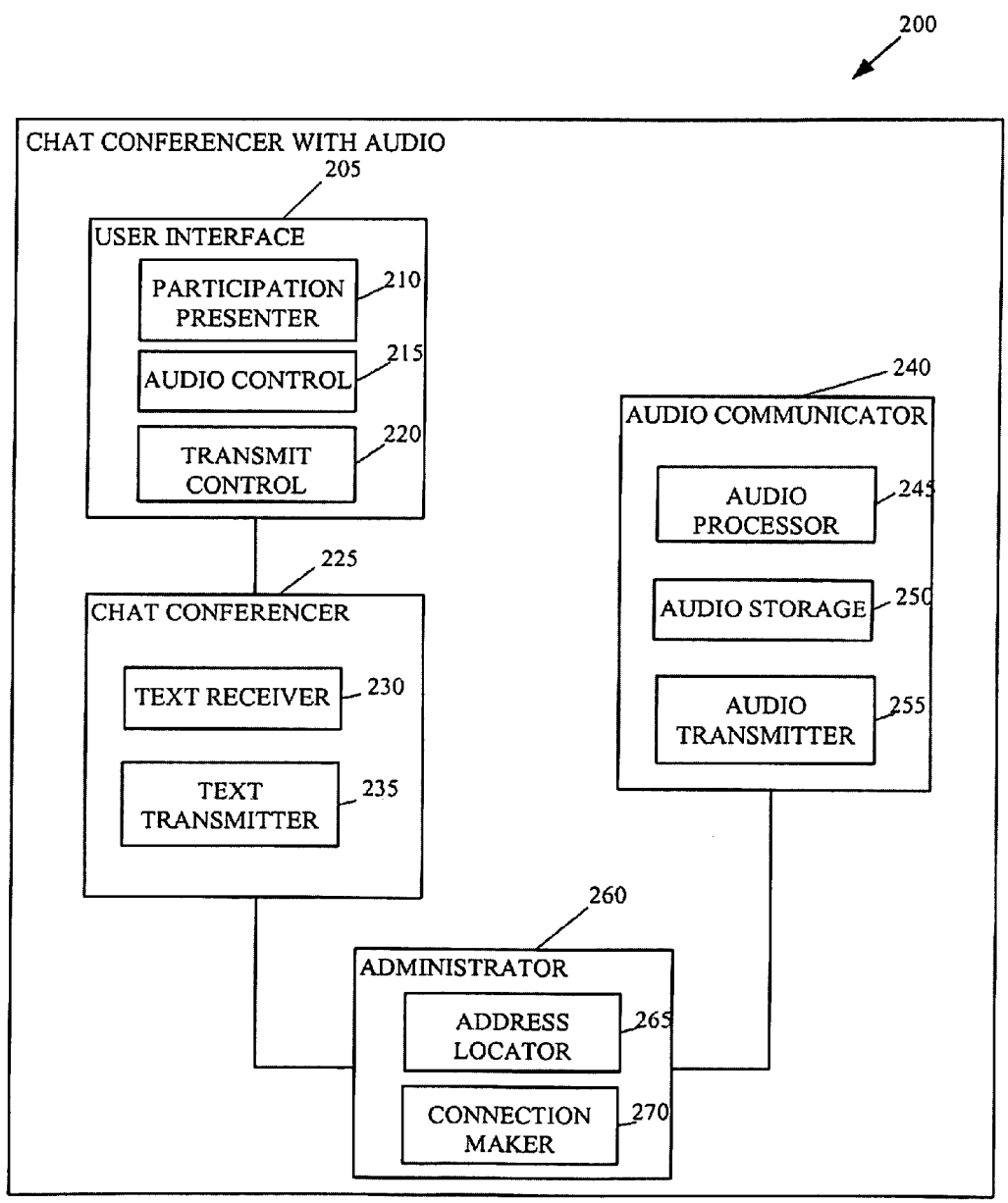
FIG. 3 depicts an embodiment of a chat conferencer with audio communications.

Turning to FIG. 3, depicted is an embodiment of a chat conferencer with audio 200 that includes a user interface 205, a chat conferencer 225, an audio communicator 240, and an administrator 260. The chat conferencer 225 is an apparatus for participating in chat conferences. It includes text receiver 230 to receive text entered by a participant and text transmitter 235 to transmit the text to the other chat conference participants, either directly or through a conference server. The text may be displayed on the screens or other display devices of the other participants. A text message transmitted by the text transmitter 235 may be sent to all of the other participants. The text transmitter 235 may not provide a mechanism for sending the text message to fewer than all of the participants.

Audio communicator 240 includes an audio processor 245, audio storage 250, and audio transmitter 255. Audio communicator 240 is an apparatus for capturing audio and transmitting the audio across a network. Audio processor 245 may capture sound produced by a participant and transform the sound into digital form for transmission across a network. Audio processor 245 may include an input device such as a microphone, which converts sound waves into electrical waves. The microphone may be built into a computer or other network enabled device, or may plug into a port on the device. Audio processor 245 may also include an audio to digital converter for converting electrical waves into digital information. For example, the sound card of a computer may contain an audio to digital converter. Audio storage 250 may store audio captured from a user. Audio transmitted to one chat conference participant may be stored for later transmission to other participants. Audio transmitter 255 sends audio across a network. Audio transmitter 255 may, for example, break up an audio file into small pieces and place the pieces into packets with appropriate headers. In some embodiments, audio communicator 240 may adhere to a standard protocol for the transmission of audio across a network, such as H.323, MGCP, or SIP. In alternative embodiments, audio communicator 240 may follow a proprietary protocol.

User interface 205 includes a participation presenter 255, an audio control 215, and a transmit control 220. User interface 205 provides an integrated interface for a chat conference and audio communications. Within the single interface of user interface 205, a participant in a chat conference can view text messages sent over the chat conference, view a list of participants and their status, and send audio or other voice messages to selected participants. The participation presenter 210 may present to a participant a list of the participants of the chat conference and other contacts of the participant. In some embodiments, the participant may be able to click on the name of a contact to invite the contact to join the chat conference. In some embodiments, the participant may click on the name of another participant to select the participant for the transmission of an audio message. Because the user interface 205 integrates the chat conference and audio messages, the participant does not have to perform a search to obtain an IP address or other address in order to transmit an audio message to another participant.

The audio control 215 provides an interface through which a participant may issue commands on capturing sound. Similarly, the transmit control 220 provides an interface for issuing commands to control the transmission of the captured sound. The participant may, for example, issue a command through the audio control 215 to begin capturing sound and may begin speaking a message for a chat conference participant. When the participant has finished, the participant may issue a command through the audio control 215 to stop capturing the sound. The participant may issue a command through the transmit control 220 to transmit the captured sound to a participant designated through the participation presenter 210. In some embodiments, a mouse may function as the interface for designating a recipient of the sound, as the audio control 215, and as the transmit control 220. In further embodiments, a participant may move a pointer over the name of another conference participant, click on a mouse button to select the other participant as the recipient of an audio transmission; hold the mouse button down to start capturing the sound, and release the mouse button to stop capturing the sound and transmit the sound. In alternative embodiments, holding the mouse button down may start transmission as well as capturing the sound. These types of embodiments may maximize ease of use of the audio feature. A single mouse button may be used to transmit an audio communication to another participant. Thus, a participant may transmit audio communications with very little effort.

In other embodiments, other interface features such as a pop-up menu or a button may function as the record control 215 or the transmit control 220. In some embodiments, a participant may transmit the captured sound to multiple recipients. In these embodiments, the captured sound may be stored or recorded. After transmitting the captured sound to a first participant, the participant may select other participants through the participation presenter 210 and utilize the transmit control 220 to transmit the recorded sound to them. In some of these embodiments, the recorded sound may be transmitted to several participants with one transmit command. In other of these embodiments, only a single recipient may be selected for each transmission.

Administrator 260 includes address locator 265 and connection maker 270. Address locator 265 locates the participants and the other contacts displayed by the participation presenter 210. Connection maker 270 establishes connections between a participant and other participants. In many embodiments, administrator 260 may reside on a server. A participant may connect to the server to join the conference. In other embodiments, a client may perform the administrative functions. In some embodiments, a conference server may provide the client with address information. The client may use the address information to connect a participant to other participants. In still other embodiments, clients may obtain address information without the use of a conference server.

Figure 4:
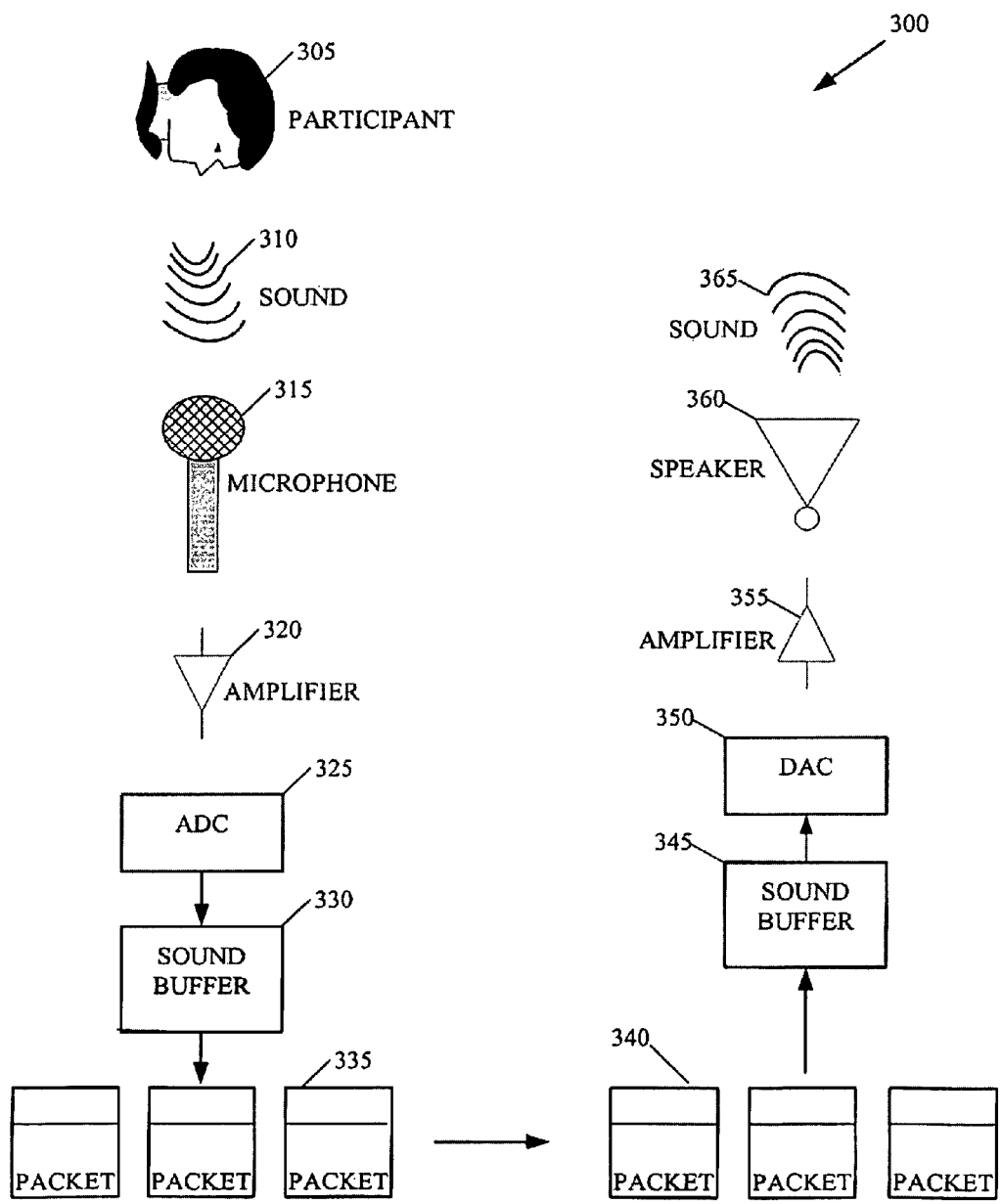
FIG. 4 depicts an embodiment of a system to transmit sound across a network.

FIG. 4 depicts an embodiment of a system 300 to transmit sound across a network. System 300 may transmit audio communications over a network during a chat conference. The system includes a microphone 315, two amplifiers 320 and 355, an analog to digital converter 325, a digital to audio converter 350, two sound buffers 330 and 345, and sound packets 335 and 340. A participant 305 in a chat conference may produce sound 310, for example, by speaking. The sound may also be non-verbal. In alternative embodiments, the sound may be produced by an agency other than a participant. Microphone 315 converts the sound waves into electrical signals. The sound waves may produce vibrations in a diaphragm, a thin plate contained in the microphone; and the vibrations of the diaphragm may induce electrical signals. In some embodiments, the microphone 315 may be a component of a conference participant network device, such as a built-in microphone in a computer or a cell phone. In alternative embodiments, the microphone may plug into the conference participant network device. For instance, a microphone jack may plug into a computer.

Amplifier 320 boosts or increases the strength of the electrical signals produced by the microphone. The signal then goes to an analog to digital converter (ADC) 330, which converts the electrical waves to digital forms. ADC 330 may measure the electrical signals produced by the microphone at a predetermined frequency ('sample' the signals), divide the amplitudes of the waves into ranges, and record the ranges. For example, an ADC that encodes the interval as an 8-bit number may divide the amplitude of waves into 256 ranges. For each sample, the ADC 330 may determine the range in which the wave amplitude falls. For example, an 8-bit ADC may find that successive amplitudes fall into the range of 128, 135, and 180 in successive samples. The ADC may return the numbers 128, 135, and 180 as the value of those samples. The sampling rate may depend upon the protocol used for the transmission of sound across a network. Common protocols include the G.711, G.722 and G.720 protocols, audio components of the H.323 protocol suite promulgated by the International Communication Union for video conferencing. Under the G.711 protocol, sampling occurs 64,000 times per second (64 kHz). Under the G.729A protocol, sampling occurs at 8 kHz. This protocol is the most commonly used by Voice over Internet Protocol (VoIP) systems. VoIP systems provide for the real-time exchange of speech and other audio over the Internet and other networks. The sampling rate of 8 kHz provides a good compromise between sound quality and bandwidth efficiency. In contrast, typical CD recordings may sample at the rate of 44.1 kHz. A computer sound card may contain an ADC.

The sampling of the electrical signal produced by microphone 315 may generate a large amount of data. At a resolution of 16 bits and a sampling rate of 48 kHz, an ADC may produce roughly six megabytes of data per minute. The data produced by ADC 325 may be stored in sound buffer 330 for further processing. In some embodiments, the data may be copied from sound buffer 330 to other storage for later retrieval, such as storage in the device by which a participant in a chat conference connects to a network.

The data in sound buffer 330 may be transmitted across a network. The data may be transmitted uncompressed or may be compressed for more efficient transmission. Uncompressed sound data may be represented as WAV files. A WAV file may include a small header with information about size, sample rate, and other facts. The remainder of the file may consist of digital numbers representing the magnitude of the sound waves at the sampling points. Methods of compression include MPEG, layer three of a standard developed by the Moving Picture Experts Group for the compression of audiodigital information. Compression may reduce the size of data by a factor of 10 or more. The data, compressed or not, is then divided into packets 335 or small pieces for information for transmission over the internet. The packets contain the actual sound data and other information, such as the source and destination internet addresses, information about the protocols being followed for transmission, information about the format of the sound data file, and information for reassembling the packets. In addition to H.323, other protocols commonly used for the transmission of audio include the Session Initiation Protocol, a protocol designed especially for VoIP, and Media Gateway Control Protocol. Other protocols can be used for adding audio to chat conferences. In particular, proprietary protocols may be used, since all participants may use the same chat conference software.

The packets may be transmitted across the internet to a network device of a recipient. There, the packets may be converted to sound by a process which is roughly the reverse of the process of transforming sound into packets. The arriving packets 340 are stored in a sound buffer 345. The sound buffer 345 may gather packets until the entire data from a transmission has been collected. Alternatively, the sound buffer 345 may gather enough packets to produce sound for a certain duration, and then pass on the packets for transformation into sound and playing the sound while additional packets continue to gather. This process of playing a portion of the sound while packets containing other portions of the sound are still arriving is called "streaming." The packets 340 are assembled into an uncompressed digital sound file and sent to the DAC converter 350, which converts the digital files into analog electrical waves. The waves are amplified by amplifier 355 and sent through speaker 360 to produce sound 365. If the fidelity of system 300 is good, sound 365 may be very similar to sound 310. Even in relatively low-fidelity systems, when sound 310 is speech, sound 365 may be recognizable as the speech that produced sound 310. In some embodiments, the packets may be transmitted to a server of a chat conference with audio as an intermediate stage in the transmission of the packets to the network device of a recipient. In further embodiments, data representing the sound may be stored in the server for later retrieval and retransmission.

Figure 5:
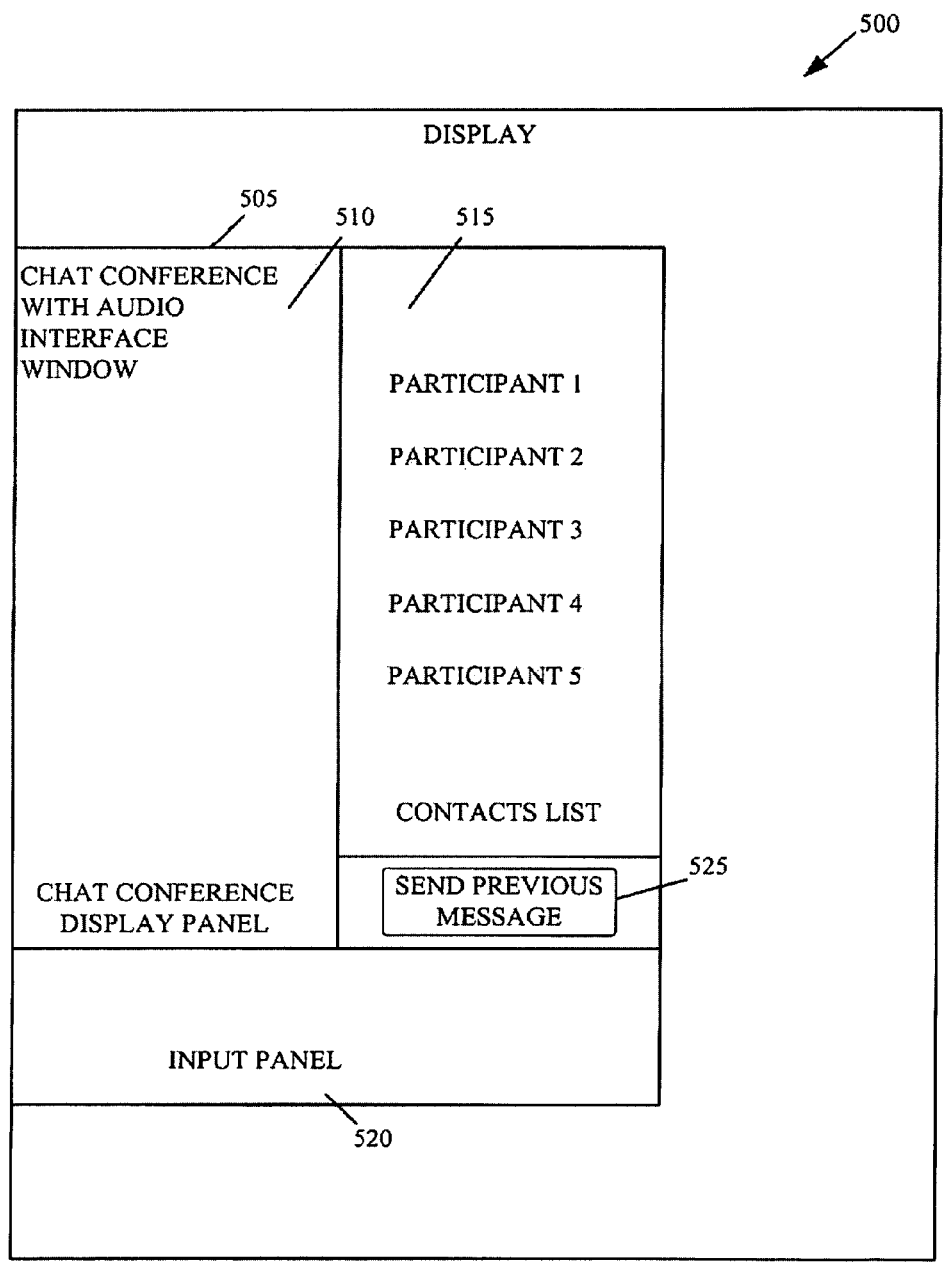
FIG. 5 depicts an embodiment of a user interface for a chat conferencer with audio communications.

Turning now to FIG. 5, there is shown a display 500 containing a chat conference with audio interface window 505. The window 505 includes a conference display panel 510, a contacts list 515, an input panel 520, and a send previous message button 525. The chat conference display panel 510 displays the text messages that have been conveyed through the conference. In some embodiments, the chat conference display panel 510 may present the complete list of messages annotated with information about the senders. The panel may be scrollable to allow a participant to see previous messages. The messages may be displayed with different fonts, to make it convenient for a participant to separate the various messages. The chat conference input panel 520 may enable a participant to enter a text message. The participant may click on the chat conference input panel 520 to select it, type a message, and hit the ENTER key to transmit the message to the chat conference. Contact list panel 515 may display a list of the conference participants and a list of a participant's frequent contacts. In some embodiments, the contact list displayed in contact list panel 515 may display information about the status of each contact. Status information may include whether a contact is connected, whether the contact is participating in the conference, the types of communications the contact is accepting, whether the contact is temporarily away, whether the participant is currently typing, and whether the contact has engaged in keyboard activity in the last half hour.

The chat conference with audio interface window 505 may enable a participant to send an audio message to one or more other participants of the chat conference. This ability to send an audio message is similar to a whispered comment to a neighbor at an in-person conference. Through the interface provided by the interface window 505, the user may select a participant or participants, capture speech or other sound, and transmit the sound to the selected participant or participants. In some embodiments of the combined user interface for a chat conference with voice, a participant may click on the name of another chat conference participant which is displayed in contacts list panel 515 to select the other participant. The participant may then hold down a mouse button to command the chat conferencer to begin capturing sound from the participant. The participant may then begin speaking a private message for another participant or may otherwise cause the production of sound. When the participant has finished speaking or otherwise producing sound, the participant may release the mouse button to command the chat conferencer to transmit the audio message to the selected participant. The audio message may be retained in storage after transmission. In alternative embodiments, the user interface may operate differently. For example, the display for the chat conference with voice may contain a record button. Clicking on the name of a participant may activate the record button. Clicking on the activated record button may start the recording of a sound message to the participant. In still other embodiments, the chat conference with voice user display may include a pop-up window which enables a user to record sound and transmit it to other participants in the chat conference.

Figure 1:
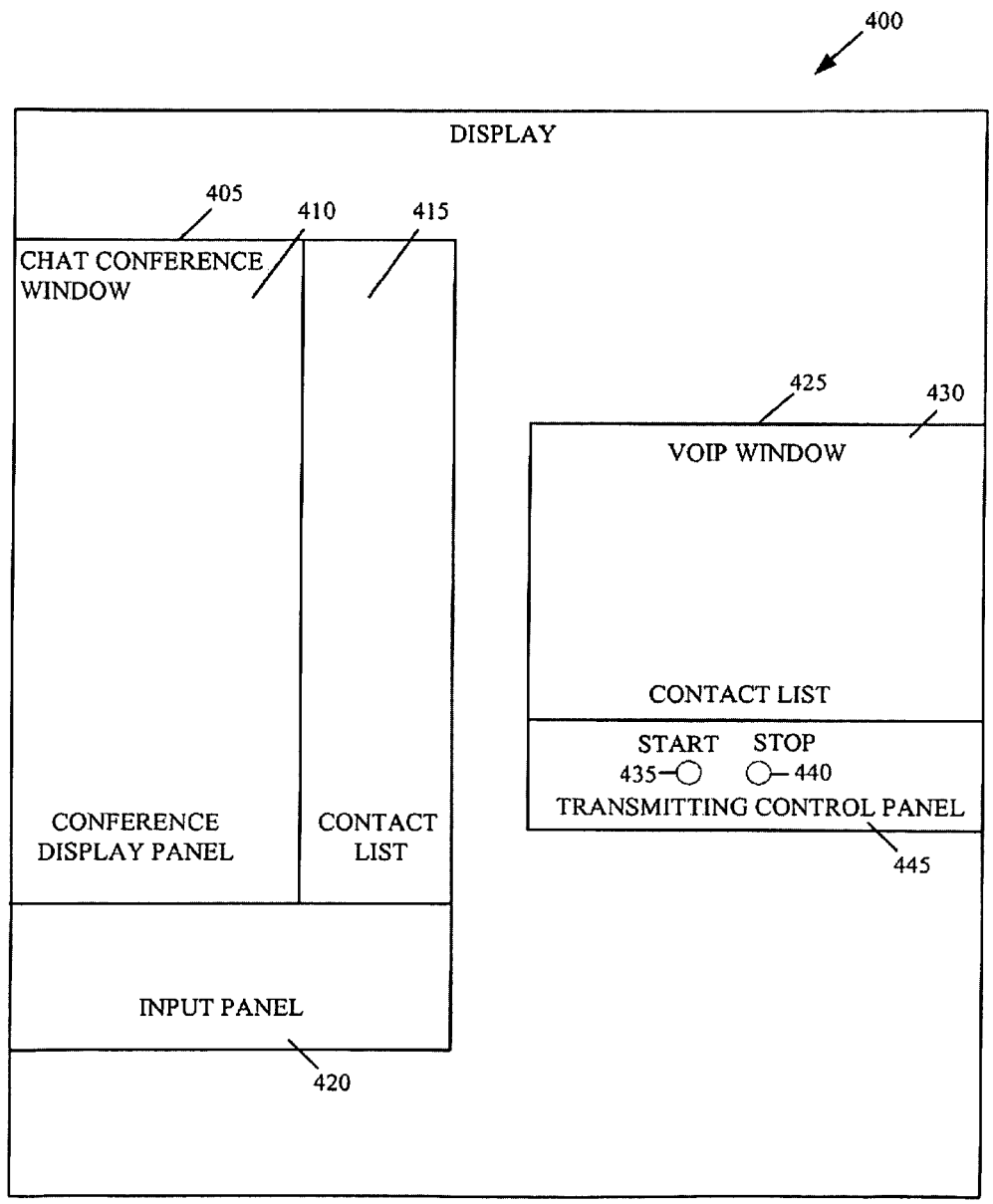
FIG. 1 depicts an prior art embodiment of separate chat conference and Voice over Internet Protocol applications.

The send previous message button 525 may enable a participant to send a message to additional participants. In some embodiments, a participant may select one or more names from the contacts list and click on the send previous message button 525 to send the previous message from storage to the one or more selected contacts. In alternative embodiments, the participant may click on the send previous message button 525 first, and then select a name or names. In alternative embodiments, a participant may be limited to one recipient per click of the send previous message button 525. In still other embodiments, the interface to a chat conference with voice may provide other mechanisms for transmitting the previous message to additional participants. In yet other embodiments, there may be no mechanism for transmitting the previous message. The user interface of FIG. 5 may provide an easy procedure for a participant in a chat conference to send an audio message to some, but not all, of the other participants, a far simpler procedure than attempting to send an audio message through the use of the prior art interface depicted in FIG. 1.

Figure 6:
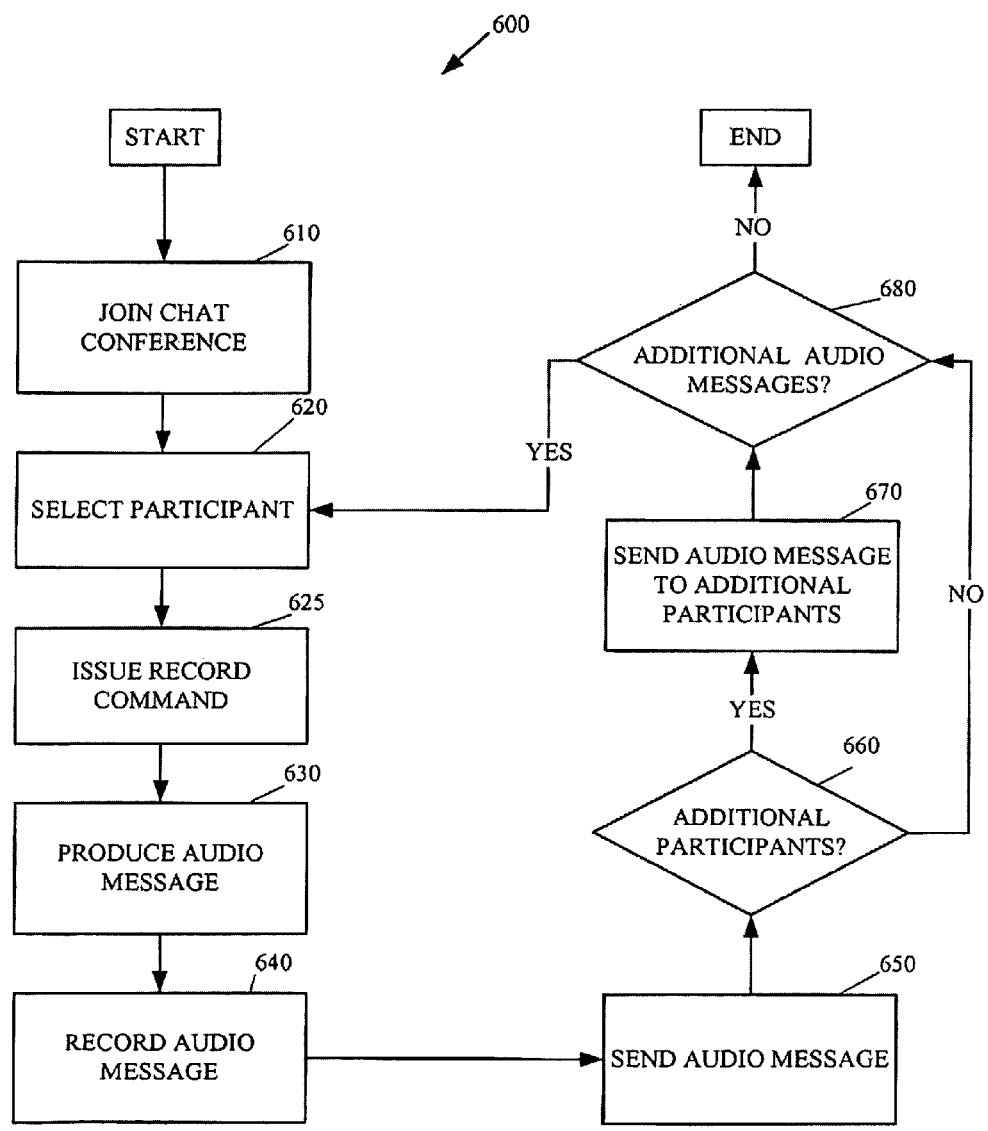
FIG. 6 depicts a flowchart of an embodiment to combine a chat conference and audio communications.

FIG. 6 depicts a flowchart of an embodiment to combine a chat conference and audio communication. Flow chart 600 begins with a participant joining a chat conference with audio (element 610). Joining the conference may result in the making of connections between a participant and the other participants, or between the participant and a server or servers for the conference. In addition, joining the conference may result in a participant being provided with a list of the other conference participants, and the other participants being provided with the name of the participant.

A participant in a chat conference with sound may desire to send an audio message or other sound message to another participant. The participant may select another participant (element 620) for the audio message through an interface for the chat conference with sound. Then participant may issue a record command (element 625) through the interface for the chat conference to instruct the chat conference with sound module to begin recording sound. The participant may, for example, hold down a designated mouse button. The participant may then produce an audio message (element 630) for transmission to the selected participant. The participant may speak the message where it can be picked up by a microphone which is a component of, or connected to, the network device used by the participant to connect to the chat conference with voice. Alternatively, the participant may produce non-speech sound either directly or through another person or means. A chat conference with voice module may record the sound produced by the participant (element 640), store the recorded sound, and send the audio message to the designated participant (element 650).

The user may desire to send the audio message to other additional participants (element 660). If so, the user may send the audio message to the additional participants (element 670). In some embodiments, the user may be able to select one or more names of other participants from the interface for the conference and click a button to transmit the stored recording of the previous message to the additional participants. In alternative embodiments, the user may be required to send the stored recorded audio message to one participant at a time. If there are additional audio messages to be sent (element 680), each element of flowchart 600 from element 620 to element 670 may be repeated. Otherwise, the sending of audio messages may end.

Another embodiment of the invention is implemented as a program product for creating a chat conference with audio such as chat conferencer with sound 200 illustrated in FIG. 3. The program(s) of the program product defines functions of the embodiments (including the methods described herein) and can be contained on a variety of data storage media. Illustrative data storage media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive). Such data media, when storing computer-readable instructions that direct the functions of the present invention, represent embodiments of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for audio communications within chat conferences. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting an audio message during a chat conference, the method comprising the steps of:

a computer displaying a user interface for the chat conference, the user interface comprising a graphical record button, a graphical send previous message button, and a list identifying one or more participants of the chat conference;

the computer receiving a user selection of an identification of a first participant of the one or more participants identified in the list, and in response, the computer activating the graphical record button so that the graphical record button is selectable in the user interface;

after the step of the computer activating the graphical record button, the computer detecting a user selection of the graphical record button in the user interface, and in response, the computer capturing the audio message and the computer transmitting the audio message to a computer of the first participant based upon the identification of the first participant;

the computer retaining the audio message in storage; and the computer detecting a user selection of the graphical send previous message button in the user interface and receiving a user selection of an identification of a second participant of the one or more participants identified in the list, and in response, the computer transmitting the audio message from storage to a computer of the second participant, the audio message having previously been transmitted to the computer of the first participant.

2. The method of claim 1, wherein the step of the computer capturing the audio message is in response to an action of a participant of the chat conference, the action performed through a pop-up menu.

3. The method of claim 1, wherein the step of the computer receiving the user selection of the identification of the first participant comprises the computer receiving the user selection of the identification of the first participant from another participant of the chat conference.

4. The method of claim 1, wherein the step of the computer detecting the user selection of the graphical record button in the user interface comprises the computer detecting a first change in state of a button on a mouse, and wherein the method further step of the computer capturing the audio message comprises the step of the computer stopping the capturing in response to the computer detecting a second change in state of the button on the mouse.

5. The method of claim 4, wherein the step of the computer transmitting the audio message to the computer of the first participant based on the identification of the first participant comprises the step of the computer starting the transmitting in response to the step of the computer detecting the first change in state of the button on the mouse and before the step of the computer detecting the second change in state of the button on the mouse.

6. The method of claim 4, wherein the step of the computer transmitting the audio message to the computer of the first participant based on the identification of the first participant is in response to the step of the computer detecting the second change in state of the button on the mouse.

7. A computer program product for transmitting an audio message during a chat conference, the computer program product comprising:
one or more computer-readable tangible storage devices;
program instructions, stored on at least one of the one or more computer-readable tangible storage devices, to display a user interface for the chat conference, the user interface comprising a graphical record button, a graphical send previous message button, and a list identifying one or more participants of the chat conference;
program instructions, stored on at least one of the one or more computer-readable tangible storage devices, to receive a user selection of an identification of a first participant of the one or more other participants identified in the list, and in response, to activate the graphical record button so that the graphical record button is selectable in the user interface;
program instructions, stored on at least one of the one or more computer-readable tangible storage devices, to detect a user selection of the graphical record button in the user interface after activating the graphical record button, and in response, to capture the audio message and to transmit the audio message to a computer of the first participant based upon the identification of the first participant;
program instructions, stored on at least one of the one or more computer-readable tangible storage devices, to retain the audio message in storage; and
program instructions, stored on at least one of the one or more computer-readable tangible storage devices, to detect a user selection of the graphical send previous message button in the user interface and receive a user selection of an identification of a second participant of the one or more participants identified in the list, and in response, to transmit the audio message from storage to a computer of the second participant, the audio message having previously been transmitted to the computer of the first participant.

8. The computer program product of claim 7, wherein the program instructions to capture the audio message capture the audio message in response to an action of a participant of the chat conference, the action performed through a pop-up menu.

9. The computer program product of claim 7, wherein the program instructions to receive the user selection of the identification of the first participant receive the user selection of the identification of the first participant from another participant of the chat conference.

10. The computer program product of claim 7, wherein the program instructions to detect the user selection of the graphical record button in the user interface detect a first change in state of a button on a mouse, and wherein the program instructions to capture the audio message stop capturing the audio message in response to detecting a second change in state of the button on the mouse.

11. The computer program product of claim 10, wherein the program instructions to transmit the audio message to the computer of the first participant based on the identification of the first participant start transmitting the audio message in response to detecting the first change in state of the button on the mouse and before detecting the second change in state of the button on the mouse.

12. The computer program product of claim 10, wherein the program instructions to transmit the audio message to the computer of the first participant based on the identification of the first participant transmit the audio message in response to detecting the second change in state of the button on the mouse.

13. A computer system for transmitting an audio message during a chat conference, the computer system comprising:
one or more computer-readable tangible storage devices, one or more processors, and one or more computer-readable memories;
program instructions, stored on at least one of the one or more computer-readable tangible storage devices for execution by at least one of the one or more processors via at least one of the one or more computer-readable memories, to display a user interface for the chat conference, the user interface comprising a graphical record button, graphical send previous message button, and a list identifying one or more participants of the chat conference;
program instructions, stored on at least one of the one or more computer-readable tangible storage devices for execution by at least one of the one or more processors via at least one of the one or more computer-readable memories, to receive a user selection of an identification of a first participant of the one or more other participants identified in the list, and in response, to activate the graphical record button so that the graphical record button is selectable in the user interface;
program instructions, stored on at least one of the one or more computer-readable tangible storage devices for execution by at least one of the one or more processors via at least one of the one or more computer-readable memories, to detect a user selection of the graphical record button in the user interface after activating the graphical record button, and in response, to capture the audio message and to transmit the audio message to a computer of the first participant based upon the identification of the first participant;

program instructions, stored on at least one of the one or more computer-readable tangible storage devices for execution by at least one of the one or more processors via at least one of the one or more computer-readable memories, to retain the audio message in storage; and program instructions, stored on at least one of the one or more computer-readable tangible storage devices, for execution by at least one of the one or more processors via at least one of the one or more computer-readable memories, to detect a user selection of the graphical send previous message button in the user interface and receive a user selection of an identification of a second participant of the one or more participants identified in the list, and in response, to transmit the audio message from storage to a computer of the second participant, the audio message having previously been transmitted to the computer of the first participant.

14. The computer system of claim 13, wherein the program instructions to capture the audio message capture the audio message in response to an action of a participant of the chat conference, the action performed through a pop-up menu.

15. The computer system of claim 13, wherein the program instructions to detect the selection of the graphical record button in the user interface detect a first change in state of a button on a mouse, and wherein the program instructions to capture the audio message stop capturing the audio message in response to detecting a second change in state of the button on the mouse.

16. The computer system of claim 15, wherein the program instructions to transmit the audio message to the computer of the first participant based on the identification of the first participant start transmitting the audio message in response to detecting the first change in state of the button on the mouse and before detecting the second change in state of the button on the mouse.

17. The computer system of claim 15, wherein the program instructions to transmit the audio message to the computer of the first participant based on the identification of the first participant transmit the audio message in response to detecting the second change in state of the button on the mouse.

18. The computer system of claim 13, wherein the program instructions to receive the user selection of the identification of the first participant receive the user selection of the identification of the first participant from another participant of the chat conference.

* * * * *